INVENTOR.
DONALD M. FENTON
BY
ATTORNEY

United States Patent Office 3,490,872
Patented Jan. 20, 1970

3,490,872
PRODUCTION OF HYDROGEN FROM CARBON MONOXIDE AND WATER IN ALKALINE SOLUTIONS
Donald M. Fenton, Anaheim, Calif., assignor to Union Oil Company of California, Los Angeles, Calif., a corporation of California
Filed Aug. 29, 1967, Ser. No. 664,061
Int. Cl. C01b 1/05
U.S. Cl. 23—213
9 Claims

ABSTRACT OF THE DISCLOSURE

The invention comprises a liquid phase homogeneous catalysis of the shift reaction wherein carbon monoxide and water are contacted at relatively mild conditions including temperatures from 50° to about 650° C. and pressures from 1 to about 500 atmospheres, with a Group VIII noble metal in a liquid reaction medium having a pH of 7 or above. A high yield of hydrogen is produced by the process and is removed as a gaseous effluent. Carbon dioxide produced by the process can also be removed in this vapor effluent or, in one embodiment of the invention using highly alkaline reaction media, the carbon dioxide is absorbed in the reaction medium which is continuously or intermittently withdrawn from the reaction zone, regenerated by decomposing the dissolved carbonate and returned to the reaction.

DESCRIPTION OF THE INVENTION

The invention relates to the production of hydrogen by the shift reaction wherein carbon monoxide and water are reacted to produce carbon dioxide and hydrogen. This reaction which has been known and practiced commercially for decades has heretofore been performed at severe reaction conditions including high temperatures and pressures and the catalysts employed have been used in heterogeneous vapor phase contacting.

A problem encountered with the shift reaction is that to attain a conversion level sufficiently high for commercial utilization, it is necessary to use considerably high temperatures, in excess of about 350° C. At these high temperatures the equilibrium constant in the reaction:

$$CO + H_2O \rightleftharpoons CO_2 + H_2$$

decreases to a low value. Consequently the shift reaction as commonly practiced represents a compromise between a desired high conversion level and a satisfactory equilibrium constant to permit a high yield of hydrogen. In addition, the severity of the conditions necessary to achieve a satisfactory conversion rate have essentially precluded liquid phase reactions and necessitated the use of a vapor phase reaction.

It is an object of this invention to provide a catalyst for the shift reaction that permits conducting the reaction at low temperatures.

It is an object of this invention to provide a liquid phase catalysis of the shift reaction.

It is an object of this invention to provide a catalyst for the shift reaction.

Other and related objects will be apparent from the following description.

The invention comprises contacting carbon monoxide and water in the presence of a liquid phase containing a Group VIII noble metal and sufficient of an alkaline material to provide a pH of the reaction medium of 7 or greater, preferably from 7.1 to 14. The contacting is effected at temperatures from 50° to about 650° C.; preferably from 100° to 400° C.; and pressures from about 1 to about 500 atmospheres, sufficient to maintain liquid phase conditions. By the term liquid phase conditions, reactions conducted in the presence of an actual liquid phase are included as well as those conducted in a pseudo liquid phase where both the temperature and pressure exceed the critical values for the liquids involved. Preferably, the pressures used are sufficient to maintain a high solubility of the carbon monoxide in the liquid or pseudo liquid phase and thereby achieve a desirably high rate of conversion. The active form of the catalyst or the catalytic surface is not known with certainty. It is possible that the active component is a complex between the basic nitrogen compound such as a metal ammine or amino complex or a metal hydroxo complex. The hydrogen production is responsive to the existence of an alkaline reaction medium and is also responsive to the presence of a basic nitrogen compound such as ammonia or an amine. In any event, suitable alkaline materials that can be used to maintain the pH of the reaction medium at 7.1 or greater and that are therefore useful in the invention include inorganic ammonium, alkali and alkaline earth metal hydroxides and salts of these bases with acids having a lower ionization constant than the hydroxide. Suitable organic alkaline materials include basic nitrogen compounds such as the alkyl and cycloalkyl amines, bifunctional amines such as the alkanolamines, polyamines such as the di-, tri- and quatro-amines, bicycloamines, aromatic heterocyclic amines, etc. These alkaline materials will be described and illustrated in detail hereinafter. The practice of the invention will be further illustrated by these figures of which:

Figure 3:
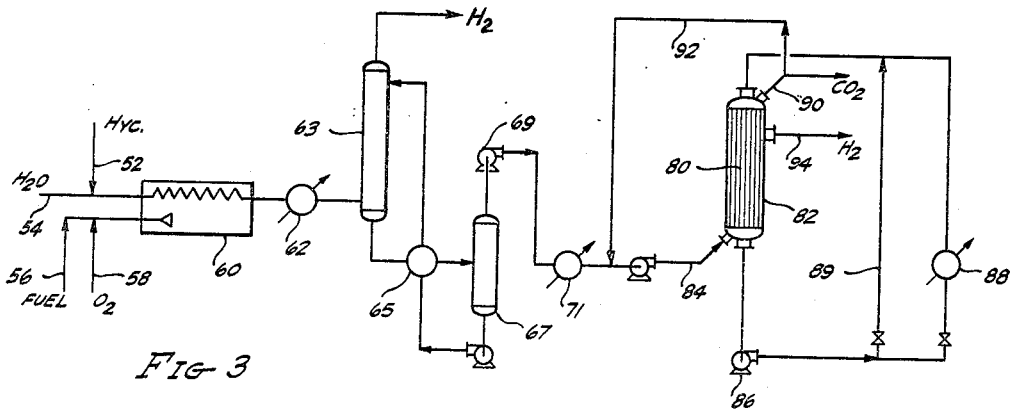
FIGURE 3 also illustrates application of the process to the treatment of a carbon monoxide and hydrogen stream produced by reforming of a hydrocarbon.

The invention is applicable to treatment of carbon monoxide which can be obtained from a variety of processes. In one application a carbon monoxide stream can be obtained as a surplus stream from the basic oxygen steel plants wherein the molten iron is treated with oxygen in a blast furnace operation and produces a gas containing up to 97 percent carbon monoxide. This gas stream after removal of entrained foreign matter and refining to remove gaseous contaminants can be employed as a direct feed to the shift conversion of my invention.

Carbon monoxide containing streams can also be obtained for other, conventional methods used in the manufacture of hydrogen. In these methods, a hydrocarbon stock such as natural gas, refinery gas, virgin and converted gasoline stocks, distillates, fuel oil, crude oil, etc., or carbonaceous solids such as coke or coal are subjected to partial oxidation and/or treatment with steam at high temperatures to form a mixture of carbon monoxide and hydrogen. Hydrocarbon stocks are commonly used for this processing and are converted by contacting with steam or oxygen at high temperatures with or without catalysts. Typically, the hydrocarbons are converted at pressures from about 250 to about 750 p.s.i. and temperatures from about 1250° to about 1950° F. When catalysts are used, the active component is commonly an iron group metal such as nickel, cobalt, iron, etc. The product of this treatment comprises a mixture of carbon monoxide and hydrogen with minor amounts of other materials such as unconverted hydrocarbon, carbon dioxide, nitrogen and oxygen.

In general, therefore, the invention is applicable to the treatment of gas streams having carbon monoxide contents from about 10 to about 100 percent. Preferably the carbon monoxide streams have from about 50 to 100 percent carbon monoxide. The streams can contain hydrogen in amounts from about 0 to 70 volume percent; usually from about 0 to about 50 volume percent. Unconverted hydrocarbons up to about 5 to 10 percent can be present together with minor amounts, up to about 15 percent, of carbon dioxide and nitrogen. Some residual oxygen can also be present up to about 1 volume percent. When applied to the product of a hydrocarbon reforming process for the production of hydrogen, the invention is applied to feedstocks having carbon monoxide contents from about 34 to about 47 volume percent and hydrogen contents from about 52 to about 61 volume percent. When applied to the products of the partial oxidation of hydrocarbons, the invention is applied to a vapor stream having about 10 to 20 percent carbon dioxide, 15 to 30 percent carbon monoxide and 50 to 65 percent hydrogen.

In practice of the invention, carbon monoxide and water are contacted under alkaline conditions with the catalyst which can be a Group VIII noble metal, i.e., can be of the palladium subgroup comprising palladium, rhodium and ruthenium, or can be of platinum subgroup comprising platinum, osmium and iridium. The contacting can be initiated with the catalyst in the metallic form or the catalyst can be charged to the reaction zone as a soluble salt, oxide or chelate. Examples of suitable materials include the halides, oxides, nitrates, sulfates, carboxylates, and cyanides of the aforementioned metals. Examples of these are platinum bromide, palladium chloride, osmium fluoride, iridium bromide, palladium cyanide, iridium cyanide, palladium iodide, platinum nitrate, palladium nitrate, iridium nitrate, palladium oxide, iridium oxide, rhodium oxide, rhodium sulfate, palladium sulfate, iridium cyanide, platinum acetate, palladium propionate, iridium isobutyrate, osmium valerate, rhodium caproate, platinum caprylate, etc. The Group VIII noble metals can also be supplied as chelates such as the acetyl acetonates, or complexes thereof with such conventional chelating agents as ethylene diamine tetraacetic acid and its esters and in particular its salts, citric acid, etc. The Group VIII noble metals can also be supplied to the reaction zone as soluble ammine complexes or these ammine complexes can be formed in situ by adding any of the aforementioned soluble salts to an aqueous ammonical solution containing from 0.1 to 20 percent ammonia.

The reaction is performed in an aqueous alkaline solution which has a pH greater than 7, e.g., from 7.1 to 14.0 and preferably has a pH from about 7.5 to 12. The desired alkaline solution is obtained by the use of an inorganic base or inorganic alkaline material or by the use of an organic basic nitrogen compound.

Various inorganic alkaline materials can be used such as ammonium or the alkali metal and alkaline earth metal hydroxides, e.g., ammonium hydroxide, sodium hydroxide, lithium hydroxide, potassium hydroxide, cesium hydroxide, magnesium hydroxide, calcium hydroxide, barium hydroxide, etc., and mixtures thereof. Hydrazone, its hydrate and salts can be used. Ammonical solutions of any alkaline material containing from 0.1 to 10 percent free ammonia can also be used. Also useful as alkaline materials are salts of the aforementioned metals and acids having a lower ionization constant than the aforementioned metal hydroxides. These salts of weak acids will, as well known, raise the pH of the aqueous solution to which they are added and accordingly can be used in my invention. Examples of weakly ionized acids that give useful salts are arsenic acid, boric acid, carbonic acid, chromic acid, hydrocyanic acid, silicic acid, toluic acid and alkanoic acids such as acetic acid, acrylic acid, benzoic acid, butyric acid, caprylic acid, crotonic acid, ethylbenzoic acid, glutaric acid, heptanoic acid, hexanoic acid, hydroxybutyric acid, hydroxypropionic acid, hydroxybutyric acid, octanoic acid, phenyl- acetic acid, phenylpropionic acid, valeric acid, vinylacetic acid, etc.

The various organic nitrogen bases than can be employed as the organic alkaline material in the aqueous reaction medium include the alkyl and cycloalkyl amines containing up to about 10 carbons and the bifunctional alkanolamines, polyamines, bicycloamines and aromatic heterocyclic amines containing up to about 25 carbons. Examples of suitable materials include the following:

2-amino-1-butanol;
2-amino-5-diethylaminopentane;
2-(2-aminoethoxy)-ethanol;
2-aminopentane;
5-amino-1-pentanol;
1-amino-2,3-propanediol;
N-benzyl-N-methylethanolamine;
n-butylamine;
cyclohexylamine;
cyclohexylaminoethanol;
N,N'-dicyclohexyl-1,3-propanediamine;
cyclopropylamine;
cyclooctylamine;
cyclopentylamine;
1-amino-N-(β-hydroxyethyl)-propane;
1,2-diaminopropane;
1,3-diaminopropane;
diethanolamine;
tetramethylethylenediamine;
N,N-diethyl-m-toluidine;
N,N-diethylaniline;
ethanolamine;
ethanolpropanolamine;
2-ethoxyethylamine;
N-ethylaniline;
ethylenediamine;
furfurylamine;
1,6-hexanediamine;
3,3-iminobispropylamine;
isobutylamine;
isopropylamine;
N-isopropylaniline;
3-methoxypropylamine;
N-methylaniline;
N-methylcyclohexylamine;
N-methylfurfurylamine;
propylamine;
tributylamine;
4-amino-m-cresol;
aniline;
2(2-aminoethyl)-pyridine;
2-amino-3-hydroxypyridine;
3-aminoethylpyridine;
2-amino-3-picoline;
2-aminopyridine;
2-anilino-5-nitropyridine;
2-benzylaminopyridine;
4-benzyl-4-hydroxypiperidine;
2-benzylpyridine;
2-bromopyridine;
2-bromo-3-pyridinol;
2-chloro-6-hydroxypyridine;
2-chloropyridine;
2,3,6-trimethylpyridine;
2-cyanopyridine;
N-cyclohexypiperidine;
2,6-diaminopyridine;
3,5-dibromopyridine;
2,3-dichloropyridine;
2,3-dihydroxypyridine;
2-dimethylaminopyridine;
2,6-dimethylpiperidine;
2-ethylpyridine;
3-hydroxy-N-methylpiperidine;
3-hydroxypiperidine;

3-iodopyridine;
2,3-lutidine;
2-morpholino-5-nitropyridine;
2-phenylpyridine;
2-picoline;
piperidine;
2-n-propylpiperidine;
pyridine;
2-pyridylcarbinol;
3-(2-pyridyl)-1 propanol;
5-aminoindole;
5-bromoindole;
5-cyanoindole;
1,2-dimethylindole;
5-hydroxy-Nω-methyltryptamine;
indole-3-carbinol;
2-methylindole;
adenine;
2-amino-6-chloro-4-pyrimidinol;
2-amino-4,6-dihydroxypyrimidine;
2-aminopyrimidine;
2,6-dichloro-7-methyl-purine;
2,6-dichloropurine;
6,8-dihydroxypurine;
guanine;
inosine;
purine;
pyrimidine.

Since water is a reactant it is preferred to use water soluble or miscible amines to avoid phase separation in the reaction zone. As apparent to those skilled in the art, the reaction can be performed with the insoluble or immiscible amines by thorough agitation and mixing in the reaction zone to avoid phase separation or to promote sufficient mixing of the water in the organic phase to achieve a satisfactory reaction rate.

The hydrogen produced by the reaction is removed from the reaction zone as a vaporous effluent and, depending upon the alkalinity of the solution, the carbon dioxide product is removed in this vaporous effluent or is retained in the liquid solution as a carbonate. In this manner the reaction can be combined with purification of the hydrogen formed by the shift reaction by the use of alkaline materials having ionization constants greater than the first ionization constant of carbonic acid which will fix the $CO_2$ byproduct of the shift reaction. Examples of suitable materials include any of the aforementioned alkali metal, ammonium and alkaline earth metal hydroxides.

The reaction is performed by contacting the carbon monoxide with an aqueous liquid phase having a pH of 7 or greater. The temperature of the contacting can be from about 50 to about 400; preferably from about 100 to about 250; and the pressure can be from about 1 to about 1000 atmospheres; preferably from about 10 to about 100 atmospheres. The gases removed from the reaction will contain some unconverted carbon monoxide and this can be recovered and recycled if desired for further conversion. In this separation a suitable separator for recovery of the hydrogen from the recycle stream can be used such as the permeable noble metal membrane separators hereinafter described.

Figure 1:
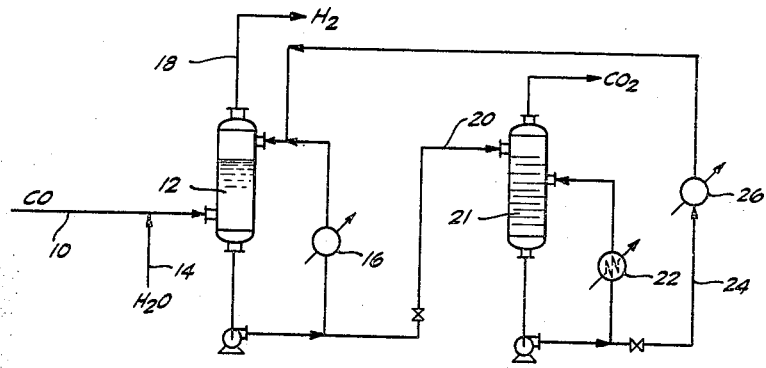
FIGURE 1 illustrates the practice of the invention using a carbon dioxide aborbing reaction medium.

The invention will now be described by reference to FIGURE 1 wherein a reactant stream rich in carbon monoxide is introduced through line 10 to contact a liquid phase maintained within reactor 12. Aqueous reaction medium can be introduced as needed through line 14. The reaction zone is maintained at the desred temperature by circulation of a portion of the reaction medium through cooler 16. The product hydrogen is removed from the reaction zone as a vapor effluent through line 18. The liquid in the reaction zone as illustrated is an alkaline material reactive with the carbon dioxide product and the resultant solution of carbonate is removed from the reaction zone and is depressured and passed through line 20 to drum 21 where the carbon dioxide is removed by vaporization at the reduced pressure. To maintain the necessary heat for decomposition of the carbonates in the liquid supplied to zone 21 and auxiliary heater 22 can be provided and the liquid in zone 21 can be circulated through this heater and raised to a sufficient carbonate decomposition temperature and returned to the separation vessel. The liquid, reduced in carbonate content, is passed through line 24 and cooler 26 for return to the process.

Figure 2:
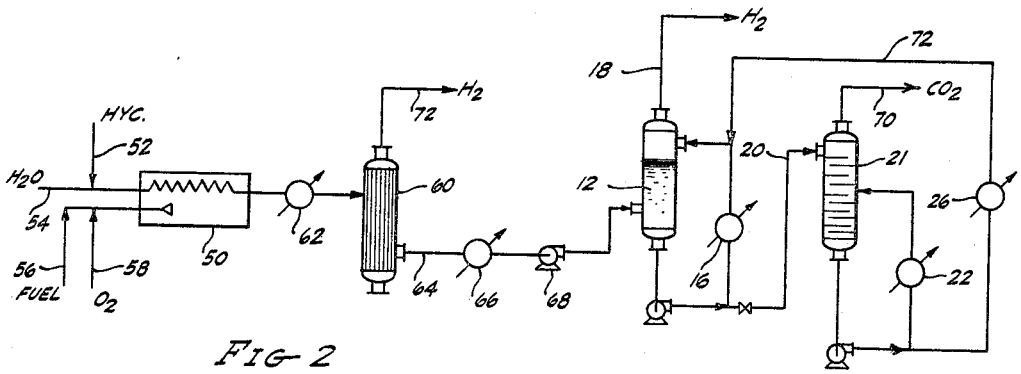
FIGURE 2 illustrates an application of the invention as applied to a commercial process for the production of hydrogen by the reforming of a hydrocarbon stream.

FIGURE 2 illustrates the process as applied to the treatment of a hydrocarbon reforming effluent. This reaction, which is an endothermic reaction, comprises the reaction of steam and a hydrocarbon at high temperatures so as to form a mixture of hydrogen and carbon monoxide. The reaction is generally performed in the tubes of a furnace as illustrated at 50. The hydrocarbon stream is introduced through line 52 and admixed with steam introduced through line 54. Heat for the reaction is supplied by the combustion of a fuel supplied through line 56 with oxygen, air or mixtures of oxygen and air supplied through line 58. The effluent from the reforming furnace comprises a mixture of carbon monoxide and hydrogen and contains from about 30 to 45 percent carbon monoxide and from about 50 to about 65 percent hydrogen.

The efficiency of the liquid shift reaction of my invention is improved if it is performed in the substantial absence of extraneous hydrogen. Accordingly I prefer that the effluent stream containing hydrogen be treated to separate the hydrogen therefrom prior to introduction into the liquid phase shift reaction zone. This can be achieved by a hydrogen diffusion unit which is generally indicated at 60. The diffusion unit uses a Group VIII noble metal membrane, typically palladium or palladium alloys with silver or other noble metals, which is permeable to hydrogen. The membrane can be a thin foil or sheet which is supported by a porous metal or ceramic body to permit use of pressure drops across the foil of from 50 to about 500 p.s.i. Alternatively, the noble metal can be deposited on the surface of a gas permeable body such as a sintered metal or ceramic powder body by vapor deposition, liquid impregnation or electroplating. Various patents describing hydrogen diffusion cells which can be used include 2,824,620; 2,911,057; 2,958,391 and 2,961,062.

Because the hydrogen separation unit 60 performs best at temperatures of about 500° to 800° F. and since these temperatures are considerably lower than the 1200°–1800° F. necessary in reforming furnace 50, a cooler 62 is interposed between the units to reduce the temperature of the hydrogen rich effluent from the reforming furnace. The temperature is reduced to the 500°–800° F. range necessary for hydrogen separation and then passed into a separation unit employing a Group VIII noble metal, hydrogen-permeable separator. As previously mentioned, these units are generally formed with palladium or palladium alloys with other noble metals such as silver, ruthenium, or platinum. At the aforementioned elevated temperatures, molecular hydrogen dissociates to atomic hydrogen on the palladium surface and dissolves in the palladium, diffuses through it and recombines as molecular hydrogen on the opposite surface. Generally the pressure drop across the palladium barrier is in the order of 50–500 p.s.i. and the pressure of the reactants introduced into this unit should be at least about 200–750 p.s.i.g.

The diffusion unit illustrated at 60 comprises a bundle of palladium or palladium alloy tubes in a shell generally indicated at 60. The hydrogen rich stream can be supplied to the shell side of the tube bundle and the hydrogen is removed from a tube header and through line 62. The tubes can be formed of palladium or palladium-silver alloys, the latter being resistant to cracking of the palladium film which can be encountered with the pure palladium tubes when heated through phase transition temperatures less than about 500° F. in the presence of hydrogen. The vapor purified of its hydrogen content and now comprising a gas rich in carbon monoxide is removed through line 64 and can be cooled in cooler 66 to a temperature of about 150° to about 250° C. A compressor 68 is used to raise the gas stream to the desired reaction pressure from about 10 to about 100; preferably from about 15 to about 75 atmospheres. The stream of carbon monoxide rich gas is then introduced into a reactor indicated as 12 and the remaining units are similar in design to those previously described in regard to FIGURE 1. As mentioned in regard to this figure, the temperature of the reaction zone 12 is maintained by circulation of a portion of the reaction medium through cooler 16 and the hydrogen product of the reaction medium is removed through line 18. The carbonate containing liquid is diverted through line 20 to a regeneration tower 21 where the carbonates are decomposed at reduced pressures and elevated temperatures, the necessary heat being supplied through reboiler 22. The carbon dioxide is removed and vented through line 70 and the regenerated alkaline solution is passed through cooler 26 and returned to further contacting through line 72. In this manner hydrogen rich effluents are recovered in lines 62 and 18 of the combined process.

FIGURE 3 illustrates an adaptation of my process wherein the hydrogen purification and shift reaction are conducted simultaneously in a single reactor. Again as previously described, a reforming furnace 50 is supplied with hydrocarbon and steam through lines 52 and 54 and fired with fuel through line 56 and combusted by the oxygen supplied through line 58. The reformer effluent is cooled in cooler 62 and purified of the hydrogen which can be removed through a diffusion separator or, alternatively, can be removed by absorption of the carbon monoxide in tower 63 using an aqueous cuprous solution such as aqueous cuprous acetate. The carbon monoxide rich solution is passed from the absorber, through indirect heat exchange with the regenerated cuprous acetate solution in exchanger 65 to tower 67 where the carbon monoxide is desorbed and removed as a vapor effluent through line 69. Since the shift reactor 80 is also a hydrogen diffusion separator, the entire hydrogen purification step in towers 63 and 67 can be eliminated and the reformer effluent can be passed directly to reactor 80. The carbon monoxide is then compressed and heated to the desired shift reaction temperature in heater 71, combined with recycled gases from line 92 and introduced into the shift reactor which comprises a palladium tube bundle suspended within a shell unit 82. The reaction is performed on the tube side of the diffusion bundle by passing the carbon monoxide rich stream through line 84 to the tube header of the unit. The interior surface of the tube is maintained wetted with the alkaline solution which is circulated through the tube bundle by pump 86. Since the reaction is exothermic, the circulated solution is passed through cooler 88 to maintain the desired reaction temperature. In the embodiment as illustrated the alkaline solution is non-reactive with the carbon dioxide product and accordingly the carbon dioxide is removed as converted vapor from the upper tube header through line 90. This stream also will contain some unconverted carbon monoxide which can be recycled for further contacting through line 92. The catalyst for the shift reaction can be any of the aforementioned Group VIII noble metals, oxides or salts thereof and is suspended or dissolved in the reaction medium. Sufficient agitation, when necessary to maintain the catalyst suspended or to prevent phase separation, can be achieved by jetting the reactant gas stream into the liquid and/or by maintaining a high external recycle rate through pump 86 and line 89. When the tube bundle is maintained in a flooded condition, the direction of liquid flow can be reversed to an upwardly flowing liquid in the tube bundle which will also prevent settling of a suspended metal catalyst. As illustrated, the liquid flow is also applicable to a film reaction with the inside tube surfaces covered with a downwardly flowing liquid film.

The shift reaction can also be performed directly on the interior surface of the tube bundle and preferably the tube bundle is an alloy which provides the catalyst for the conversion. Accordingly, the tube bundle can be a palladium or palladium-silver alloy preferably containing up to about 75 percent of iridium, platinum or rhodium. It is also within the scope of my invention to utilize the more conventional palladium and palladium alloys heretofore employed in diffusion units since palladium itself is active for the shift conversion in accordance with my invention. A useful unit comprises a tube bundle formed by coating or impregnating the outer surfaces of gas permeable cylinders in the manner described in 2,958,391 by vapor deposition or by electroplating. The porous cylinders which are used in the unit can also be coated with a noble metal, hydrogen-permeable layer by impregnation of the cylinders with a solution of a salt of the noble metal followed by drying to remove the solvent and treatment, e.g., heating, to decompose and remove the salt anion and thereby deposit the noble metal. An example is the impregnation of a porous cylinder of sintered stainless steel powder with an aqueous solution of palladium nitrate followed by drying and calcining of the cylinder to deposit palladium in the pores and interstices of the porous cylinder. Since palladium does not exhibit the degree of catalytic activity in my process as do rhodium, iridium or platinum, the impregnating solution preferably should also contain a salt of one of the latter metals and the ratio of palladium to rhodium, platinum or iridium can be varied in ratios of 10/1 to 1/10 to balance the rate of hydrogen diffusion with the rate of hydrogen formation.

The hydrogen produced by the shift reaction diffuses through the hydrogen permeable palladium alloy tubes and is recovered from the shell side of the bundle and removed through line 94. In this manner a continuous production and separation of hydrogen is effected within a reactor that comprises hydrogen permeable palladium and palladium alloy walls.

The invention will now be illustrated and the results obtainable demonstrated by the following examples:

EXAMPLE 1

The experiments were performed in a one-gallon laboratory autoclave equipped with means to cool and mechanically stir the liquid phase. In the first series of experiments ammonium hydroxide was used as the source of the alkaline material.

In the first experiment the autoclave was charged with 800 milliliters of ammonium hydroxide, 28 weight percent ammonia, and 0.33 gram iridium trichloride. The autoclave was closed, pressured to 800 p.s.i. with carbon monoxide and then heated to 200° C. and maintained at that temperature for 2 hours. Upon completion of the reaction period the autoclave was cooled, depressured, opened and the liquid contents weighed to indicate a weight increase of 41 grams. The liquid phase separated from the reaction was analyzed and found to contain 48 grams carbon dioxide. The gas phase contained 28.6 percent of hydrogen.

The reaction was repeated by charging 800 grams of ammonium hydroxide of 28 weight percent ammonia to the autoclave and adding 0.5 gram of a catalyst comprising 5 percent metallic rhodium on carbon. The autoclave was pressured to 800 p.s.i. with carbon monoxide and heated to 200° C. and maintained at that temperature for 2 hours. At the end of the 2 hour period the final pressure of the autoclave was 675 p.s.i. and the autoclave was then cooled, depressured, opened and the liquid contents weighed to reveal a 27 gram weight increase. The gas from the autoclave was collected and analyzed for hydrogen and found to contain 24.8 volume percent hydrogen. No carbon dioxide was contained in the product gas and the liquid contained 6.2 weight percent carbon dioxide as ammonium carbonate.

The reaction was repeated by charging 800 grams of ammonium hydroxide of 28 weight percent ammonia and 0.33 gram of rhodium trichloride. The autoclave was pressured to 800 p.s.i. with carbon monoxide and heated to 200° C. and maintained at that temperature for two hours. Upon completion of the 2 hour period the autoclave was cooled and its pressure was observed to be 675 p.s.i. The autoclave was then depressured and opened and the liquid contents weighed to reveal a 42 gram weight increase. The vapor effluent from the autoclave was collected and analyzed for hydrogen and found to contain 27.3 percent hydrogen and 1.67 percent carbon dioxide. The liquid recovered from the autoclave contained 12.0 weight percent carbon dioxide as ammonium carbonate.

The reaction was again repeated by charging 800 grams of ammonium hydroxide, 5 grams of 2-chloropyridine and 0.2 gram of powdered rhodium metal to the autoclave. The autoclave was pressured to 800 p.s.i. with carbon monoxide and heated to 200° C. and maintained at that temperature for two hours. Upon completion of the two hour period the autoclave was cooled and its pressure was observed to be 700 p.s.i. The autoclave was then depressured and opened and the liquid contents weighed to reveal a 23 gram weight increase. The gas collected from the autoclave was analyzed and found to contain 20.3 percent hydrogen and 0 percent carbon dioxide.

When the reaction is attempted in the absence of added base using only water as the reaction medium, substantially no conversion to hydrogen and carbon dioxide occurs.

EXAMPLE 2

The following experiments will illustrate the use of a heterocyclic basic nitrogen compound as the added alkaline material. In the first experiment the autoclave was charged with a mixture of 400 grams pyridine, 400 grams water, 0.33 gram rhodium trichloride and 3 grams of 2-chloropyridine. The autoclave was closed and pressured to 800 p.s.i.g. with carbon monoxide and heated to 200° C. and maintained at that temperature for two hours. Upon completion of the two hour period, the autoclave was cooled and the final pressure was 1125 p.s.i.g. The autoclave was depressured and opened and the liquid contents weighed to reveal a 37 gram weight decrease. The gases collected from the autoclave were analyzed and found to contain 10.82 percent hydrogen and 8.76 percent carbon dioxide.

The reaction was repeated using 400 grams pyridine, 400 grams ammonium hydroxide and 0.33 gram iridium tetrachloride. The autoclave was closed, pressured to 800 p.s.i.g. with carbon monoxide and heated to 200° C. and maintained at that temperature for two hours. Upon completion of the two hour period the autoclave was cooled and the pressure was observed to be 800 p.s.i.g. The autoclave was depressured and opened and the liquid contents weighed to reveal a 16 gram weight decrease. The liquid was analyzed and found to contain 8 percent carbon dioxide as ammonium carbonate and the gas collected from the autoclave was analyzed and found to contain 14.3 percent hydrogen and 1.5 percent carbon dioxide.

The autoclave was depressured and opened and the liquid 400 grams water and 0.14 gram rhodium trichloride. The autoclave was closed, pressured to 800 p.s.i.g. with carbon monoxide, heated to 200° C. and maintained at that temperature for two hours. The autoclave was cooled and the final pressure was observed to be 975 p.s.i.g. The autoclave was depressured and opened and the liquid contents weighed to reveal a 56 gram weight decrease. The vapor collected from the autoclave was analyzed and found to contain 24.3 percent hydrogen and 25.3 percent carbon dioxide.

The liquid recovered from the previous experiment was returned to the autoclave and 30 grams of water was added thereto. The autoclave was closed, pressured to 800 p.s.i.g. and heated to and maintained at 200° C. for two hours. The final pressure of the autoclave after cooling was 975 p.s.i.g. The autoclave was then depressured, opened and the liquid contents weighed to detect a 58 gram weight decrease. The liquid was analyzed and found to contain 1.4 weight percent carbon dioxide and the gas phase was analyzed and found to contain 12.0 percent hydrogen and 10.3 percent carbon dioxide.

EXAMPLE 3

The following examples illustrate the use of other amines as the alkaline material.

In the first experiment the autoclave was charged with 400 grams tetramethylethylenediamine and 400 grams water and 0.33 gram of rhodium trichloride. The autoclave was closed and pressured to 800 p.s.i.g. with carbon monoxide and then heated to and maintained at 200° C. for two hours. Upon completion of the reaction period the autoclave final pressure after cooling was 700 p.s.i.g. The autoclave was then depressured and opened and the liquid contents weighed to detect an 11 gram weight increase. The liquid was analyzed and found to comprise 14.6 weight percent carbon dioxide and the gas phase was analyzed and found to contain 33 percent hydrogen and 9 percent carbon dioxide.

The liquid phase from the preceding experiment was recharged to the autoclave with the addition of 50 milliliters of water and the reaction was repeated to observe in two successive recycles a 90 and a 50 gram weight decrease and comparable activity for the formation of hydrogen.

The autoclave was charged with 400 grams ethylene diamine and 400 grams water, 0.2 gram platinum oxide and 5 grams of hydrazine hydrate. The autoclave was closed, pressured to 800 p.s.i.g. with carbon monoxide and heated to 200° C. and maintained at that temperature for two hours. Upon completion of the two hour period and upon cooling the autoclave pressure was 550 p.s.i.g. The autoclave was depressured and opened and the liquid contents weighed to detect a 126 gram weight increase. The liquid was analyzed and found to contain 6.6 weight percent carbon dioxide and the gas separated from the autoclave was analyzed and found to contain 1.7 percent carbon dioxide and 35.0 percent hydrogen.

The reaction was repeated by charging to the autoclave 400 grams water, 400 grams ethylenediamine and 0.2 gram platinum oxide. The autoclave was pressured to 100 p.s.i.g. with carbon monoxide and heated to 200° C. and maintained at that temperature for two hours. Upon completion of the two hour period and upon cooling the autoclave pressure was observed to be 95 p.s.i.g. The autoclave was depressured and opened and the liquid contents weighed to detect a 2 gram weight decrease. The gas separated from the autoclave was analyzed and found to contain 0.2 percent carbon dioxide and 23.0 percent hydrogen.

The reaction was performed with a rhodium catalyst by charging to the autoclave 500 grams water, 300 grams ethylene diamine, 0.33 gram rhodium trichloride and 5 grams hydrazine hydrate. The autoclave was pressured to 100 p.s.i.g. with carbon monoxide and heated to 200° C. and maintained at that temperature for two hours. Upon completion of the two hour period and upon cooling the autoclave pressure was 75 p.s.i.g. The autoclave was depressured and opened and the liquid contents weighed to reveal a 10 gram weight increase. The gas separated from the autoclave was analyzed and found to comprise 54.0 percent hydrogen and 0.6 percent carbon dioxide.

The experiment was repeated by charging to the autoclave 400 grams ethanolamine, 400 grams water and 0.33 gram rhodium trichloride. The autoclave was closed, pressured to 800 p.s.i.g. with carbon monoxide and heated to 200° C. and maintained at that temperature for two hours. Upon completion of the two hour period the autoclave was cooled and the pressure was 600 p.s.i.g. The autoclave was depressured and opened and the liquid contents weighed to reveal an 88 gram weight increase. The liquid phase was analyzed and found to contain 11.6 weight percent carbon dioxide. The gas phase collected during the experiment was analyzed and found to comprise 37.7 percent hydrogen and 7.7 percent carbon dioxide.

The reaction was repeated by charging to the autoclave 200 grams of triethylenediamine, 600 grams water, 0.33 gram rhodium trichloride and 3 grams triphenylphosphine. The autoclave was closed, pressured to 100 p.s.i.g. with carbon monoxide and heated to and maintained at 200° C. for two hours. Upon completion of the two hour period the autoclave was cooled and the pressure was 750 p.s.i.g. The autoclave was depressured and opened and the liquid weighed to reveal a 23 gram weight increase. The reaction produced a total of 68 grams of carbon dioxide and an equivalent amount of hydrogen.

The reaction was repeated by charging to the autoclave 800 grams water, 150 grams glycine, 0.33 gram rhodium trichloride and 80 grams of sodium hydroxide to neutralize the glycine and produce an alkaline solution of sodium glycinate. The autoclave was closed, pressured to 800 p.s.i.g. with carbon monoxide and heated to and maintained at 200° C. for two hours. The autoclave was then cooled, depressured and opened and the liquid contents weighed to detect a 40 gram weight increase. The gas phase separated from the autoclave was analyzed and found to contain 7.5 volume percent hydrogen and 4.4 volume percent carbon dioxide.

The autoclave was charged with 700 milliliters water, 20 grams sodium hydroxide and 1 gram of 5 weight percent rhodium metal on charcoal. The autoclave was closed, pressured to 800 p.s.i.g., then heated to and maintained at 200° C. for 2 hours. The autoclave was then cooled, depressured and opened and the gas product was analyzed and found to contain 0.5 volume percent hydrogen and 0.9 volume percent carbon dioxide.

The preceding examples are intended solely to illustrate the practice of my invention and to demonstrate results obtainable therewith. It is not intended that the examples are to be limiting of the invention but that the invention be defined by the steps and materials and their obvious equivalents set forth in the following claims.

I claim:

1. The production of hydrogen from carbon monoxide and water that comprises contacting, at a temperature from about 50° to 650° C. and a pressure from about 1 to about 500 atmospheres sufficient to maintain liquid phase conditions, carbon monoxide with an aqueous liquid phase containing from about 0.001 to about 10 weight percent of a Group VIII noble metal, oxide or salt thereof and having a pH from 7.1 to about 14 wherein said contacting is performed on one side of a metallic membrane permeable to hydrogen and product hydrogen is passed through said membrane by maintaining the pressure on the other side of said membrane at a lower value than in said contacting step.

2. The method of claim 1 wherein said Group VIII noble metal is rhodium, iridium or platinum.

3. The method of claim 1 wherein said liquid phase is an ammoniacal solution.

4. The method of claim 1 wherein said liquid phase contains ethylene diamine.

5. The method of claim 1 wherein the contacting is accomplished at a temperature from about 100° to about 400° C.

6. The method of claim 1 wherein the pH of the aqueous liquid phase is 7.5 to about 12.

7. The method of claim 1 wherein said solution contains sufficient quantity of an alkyl or cycloalkyl amine having 1 to about 10 carbons, pyridine, tetramehtylethylenediamine, ethanolamine, triethylenediamine, or sodium glycinate to provide said pH.

8. The method of claim 1 wherein said hydrogen permeable membrane comprises palladium or palladium-silver alloy which also contains up to about 75 percent of iridium, platinum or rhodium.

9. The method of claim 1 wherein said membrane is coated with a rhodium, platinum or iridium metal and wherein the ratio of palladium to said metal is 10/1 to 1/10.

References Cited

UNITED STATES PATENTS

| | | | |
|---|---|---|---|
| 1,836,919 | 12/1931 | Hansgirg | 23—213 |
| 1,843,540 | 2/1932 | Casale | 23—211 XR |
| 2,038,440 | 4/1936 | Natta | 23—213 |
| 2,960,388 | 11/1960 | Johnson et al. | 23—213 |
| 3,355,249 | 11/1967 | Squires | 23—213 |
| 3,382,045 | 5/1968 | Habermehl et al. | 23—213 |
| 3,251,652 | 5/1966 | Pfefferle | 23—212 XR |
| 3,254,956 | 6/1966 | Hunter | 23—212 |
| 3,259,523 | 7/1966 | Faris et al. | 23—212 XR |
| 3,278,268 | 10/1966 | Pfefferle | 23—212 |
| 3,290,406 | 12/1966 | Pfefferle | 23—212 XR |
| 3,350,176 | 10/1967 | Green et al. | 23—212 XR |

FOREIGN PATENTS

| | | |
|---|---|---|
| 26,770 | 1912 | Great Britain. |
| 586,758 | 3/1947 | Great Britain. |

EDWARD STERN, Primary Examiner

U.S. Cl. X.R.

23—150, 204, 211